3,594,310
HYDROCRACKING CATALYST
Ernest L. Pollitzer, Skokie, Ill., assignor to Universal Oil Products Company, Des Plaines, Ill.
No Drawing. Continuation-in-part of application Ser. No. 723,886, Apr. 24, 1968. This application Mar. 20, 1969, Ser. No. 808,999
Int. Cl. C10g 13/02
U.S. Cl. 208—111                              7 Claims

ABSTRACT OF THE DISCLOSURE

A hydrocracking catalyst of a crystalline alumino-silicate carrier material, a Group I–B metal component having an atomic number below 79, and a Group VII–B metal component having an atomic number above 25. The crystalline alumino-silicate carrier is substantially pure, being at least about 90.0% by weight zeolitic.

RELATED APPLICATION

The present application is a continuation-in-part of my copending application, Ser. No. 723,886, filed Apr. 24, 1968, now abandoned, all the teachings of which copending application are incorporated herein by specific reference thereto.

APPLICABILITY OF INVENTION

The present invention relates to a novel catalytic composite having exceptional catalyst activity and stability, or the capability of successfully functioning over a prolonged period of time, when utilized in a process for hydrocracking hydrocarbon feed stocks to produce lower-boiling hydrocarbon products. The catalytic composite is especially advantageous in those hydrocarbon conversion processes which necessarily require a catalyst having the dual-function of hydrogenation and dehydrogenation, as well as cracking activity. Catalytic composites having a hydrogenation-dehydrogenation function and a cracking function enjoy widespread use as catalysts in many industries, and are utilized to accelerate a wide spectrum of hydrocarbon conversion reactions. Generally, the cracking function is thought to be associated with an acid-acting material of the porous, adsorptive, refractory inorganic oxide type which is utilized as the support, or carrier material, for a heavy metal component such as the metals or compounds of metals from Group V through Group VIII of the Periodic Table, to which metals the hydrogenation-dehydrogenation function is generally attributed.

These catalytic composites are utilized to promote a wide variety of hydrocarbon conversion reactions including hydrocracking, isomerization, dehydrogenation, hydrogenation, desulfurization, cyclization, alkylation and transalkylation, polymerization, cracking, ring-opening (a form of cracking) hydroisomerization, etc. In many cases, the commercial application of these catalysts is in processes where more than one of the indicated reactions proceed simultaneously. An example of this type of process is catalytic reforming in which a hydrocarbon feed steam, containing primarily paraffins and naphthenes, is subjected to conditions which promote dehydrogenation of naphthenes to aromatics, dehydrocyclization of paraffins to aromatics, isomerization of paraffins and naphthenes, hydrocracking of naphthenes and paraffins, etc., to produce an aromatic-rich, high-octane product effluent stream. Another example constitutes a hydrocracking process, to which the present invention is specifically directed, and wherein catalysts of this type are utilized to effect hydrogenative cracking of high molecular weight materials, to produce a lower-boiling, normally liquid, or normally gaseous (LPG) product effluent.

Regardless of the reaction involved, or the particular process, it is important that the dual-function catalyst exhibit not only the capability to perform its specified functions initially, but also that it has the capability to perform such functions satisfactorily for prolonged periods of time. The analytical terms used in the art, to measure the degree to which a particular catalyst performs its intended function, are activity, selectivity and stability. For the purposes of discussion herein, these terms are conveniently defined for a given charge stock as follows: (1) activity is a measure of the ability of the catalyst to convert the hydrocarbon reactants into desired product, at a specified severity level, wherein severity level connotes the conditions employed; (2) selectivity refers to the quantity of the reactants that are converted into the desired product and/or products; and, (3) stability refers to the rate of change of activity and selectivity parameters—the smaller rate implying the more stable catalyst. In a reforming process, for example, activity commonly refers to the amount of conversion of a given charge stock at a specified severity level, and is conveniently measured by the octane rating of the pentane-plus product stream; selectivity refers to the amount of the pentane-plus yield obtained at the particular severity level; and, stability is equated to the rate of change with time of activity, as measured by the octane rating, and of selectivity as measured by the pentane-plus liquid yield.

With respect to hydrocracking, activity, stability and selectivity are similarly defined, and for the most part, allude to the same considerations. Thus, "activity" refers to the quantity of charge stock, boiling above a given temperature which is converted to hydrocarbons boiling below the given temperature. "Selectivity" connotes the quantity of converted charge stock which boils below the desired end point of the product, and above a minimum specified initial boiling point. "Stability" refers, as in the case of catalytic reforming, to the rate of change of activity and stability. Thus, for example, where a gas oil, boiling above about 650° F., is subjected to hydrocracking, "activity" connotes the conversion of 650° F.-plus charge stock into 650° F.-minus product. "Selectivity" might allude to the degree of conversion into gasoline boiling range hydrocarbons—i.e. pentanes and heavier normally liquid hydrocarbons boiling up to about 400° F. "Stability" might be conveniently expressed in terms of temperature increase required during various increments of catalyst life, in order to maintain the desired activity.

As is well-known to those possessing expertise in the art, the principal causes of observed deactivation or instability of these dual-function catalysts is associated with coke formation on the surface of the catalys during the course of the reaction. The performance of dual-function catalysts is sensitive to the presence of carbonaceous deposits on the surface thereof. Accordingly, the major problem facing workers in this area of the art is the development of more active and selective catalytic composites that are not as sensitive to the presence of these carbonaceous materials and/or have the capability to suppress the rate of the formation of carbonaceous materials on the catalyst.

I have now found a dual-function catalytic composite which possesses improved activity, selectivity and stability when employed in a process for the conversion of hydrocarbons of the type which have heretofore utilized dual-function catalytic composites. In particular, I have found that a combination of a substantially pure crystalline aluminosilicate carrier material, a Group VII–B metal component, the latter having an atomic number greater than 25 and a Group I–B metal component, having an atomic number below 79, the carrier material being at least 90.0% by weight zeolitic, improves hydrocarbon conversion processes which utilize dual-function catalysts. Moreover, in the particular case of a hydrocracking process, I have observed that these novel catalysts yield a markedly more saturated product having an increased branched-chain paraffin content.

OBJECTS AND EMBODIMENTS

It is, accordingly, one object of the present invention to provide a hydrocarbon conversion catalyst having superior performance characteristics when utilized in a hydrocarbon conversion process. A corollary objective is to provide an improved hydrocracking catalyst possessed with superior stability, activity and selectivity.

Another object is to afford a hydrocracking catalyst comprising crystalline aluminosilicate particles, a Group VII-B metal component and a Group I-B metal component, the former having an atomic number greater than 25, and the latter having an atomic number below 79.

Still another object resides in a hydrocracking process utilizing a crystalline aluminosilicate catalyst containing a rhenium and/or technetium component combined with a copper and/or silver component. Therefore, in a broad embodiment, my invention involves a catalytic composite comprising a substantially pure crystalline aluminosilicate carrier material, at least about 90.0% by weight of which is zeolitic, a Group VII-B metallic component, having an atomic number greater than 25, and a Group I-B metal component having an atomic number below 79.

In another embodiment, my invention relates to a catalytic composite comprising a faujasite-containing carrier material, at least about 90.0% by weight of which is zeolitic, from 0.1% to 2.0% by weight of a rhenium component and from about 0.5% to about 5.0% by weight of a Group I-B metal component having an atomic number below 79, calculated as the elemental metals.

My invention particularly relates to a process for hydrocracking a hydrocarbonaceous charge stock into lower molecular weight hydrocarbons, which process comprises reacting said charge stock with hydrogen at hydrocracking conditions, and in contact with a catalytic composite comprising a substantially pure crystalline aluminosilicate carrier material, at least about 90.0% by weight of which is zeolitic, a rhenium component and a Group I-B metal component having an atomic number below 79, and, separating the resulting hydrocracked product effluent to recover hydrocarbons of lower molecular weight.

Other objects and embodiments of the present invention relate to preferred catalytic ingredients, the concentration of various components within the catalyst, a preferred method of catalyst preparation, operating conditions for use in the hydrocarbon hydrocracking process, etc.

SUMMARY OF INVENTION

As hereinbefore set forth, the catalyst of the present invention comprises substantially pure crystalline aluminosilicate particles combined with a metal component from Group VII-B, having an atomic number above 25, and a metal component from Group I-B having an atomic number below 79. With respect to the processing of some applicable feed stocks, the catalyst will also contain a halogen component, preferably fluorine and/or chlorine. These catalysts, hereinafter described in greater detail, are particularly utilized to great advantage in a process for hydrocracking various hydrocarbon charge stocks to yield a variety of lower-boiling products.

Suitable charge stocks include naphtha, or gasoline boiling range fractions, where the desired end result is the production of maximum quantities of LPG (Liquified Petroleum Gas) in the $C_{3-4}$ range. Heavier charge stocks include kerosenes, boiling in the range of 300° F. to about 600° F.; light gas oils, boiling in the range of about 500° F. to about 750° F.; heavy gas oils, boiling up to about 1050° F.; and, black oils which contain "nondistillables," being those hydrocarbons which have normal boiling points above about 1050° F. The extent to which hydrocracking is effected is dependent upon the ultimately desired product—i.e. whether LPG, motor fuel gasoline, kerosene, middle-distillates, etc., or various combinations thereof. Most of the virgin stocks intended for hydrocracking, are severely contaminated by sulfurous compounds and nitrogenous compounds, and in the case of the heavier charge stocks, metallic contaminants, insoluble asphalts, etc. Contaminated charge stocks are generally hydrotreated, or hydrorefined, in order to prepare a suitable charge for hydrocracking. The catalyst of the present invention can be beneficially utilized in the second stage of a two-stage process, in the first stage of which the fresh feed is hydrorefined.

Hydrocracking reactions are generally effected at elevated pressures in the range of about 800 to about 5,000 p.s.i.g., and preferably at some intermediate level of 1,000 to about 3,500 p.s.i.g. Liquid hourly space velocities (defined as volumes of hydrocarbon charge per hour, per volume of catalyst disposed within the reaction zone) of about 0.25 to about 10.0 will be suitable, the lower range generally considered necessary for the heavier stocks. The hydrogen circulation rate will be at least about 3,000 standard cubic feet per barrel, with the upper limit at a level of about 50,000 standard cubic feet per barrel. For the majority of feed stocks, hydrogen concentrations in the range of 5,000 to 20,000 standard cubic feet per barrel suffice acceptably. With respect to the LHSV, this is generally based upon fresh feed, notwithstanding the use of liquid recycle which produces a combined liquid feed ratio in the range of about 1.25 to about 5.0.

Operating temperature alludes to the temperature of the catalyst within the reaction zone, and is in the range of 400° F. to about 900° F. Since the principal reactions are exothermic in nature, an increasing temperature gradient is experienced as the charge stock traverses the catalyst bed, with the result that the outlet temperature is higher than that temperature at the inlet to the catalyst bed. The maximum catalyst temperature should not exceed 900° F., and it is a preferred technique to limit the temperature increase to 100° F., or less. This is readily accomplished through the use of conventional quench streams, either normally liquid, or normally gaseous, which are introduced at one or more intermediate loci of the reaction zone. The particular operating conditions, in any given situation, are generally dependent upon the charge stock characteristics and the desired end result, and will be adjusted during processing in order to achieve the intended object.

CRYSTALLINE ALUMINOSILICATE PREPARATION

While many manufacturing schemes, for a wide variety of crystalline aluminosilicates, are well-known and described in the literature, one particular method is preferred for preparing the catalyst of the present invention. This stems from the fact that an essential ingredient of this novel catalyst is a substantially pure crystalline aluminosilicate carrier material. In employing the term "substantially pure," the intended connotation is an aggregate particle at least 90.0% by weight of which is zeolitic. Thus, the final product of the present invention is distinguished from an amorphous carrier material, or prior art pills and/or extrudates in which the zeolitic material might be dispersed within an amorphous matrix with the result that only about 40.0% to about 70.0% by weight of the final particle is zeolitic.

The preferred scheme for the preparation of the crystalline aluminosilicate carrier material, for example in pilled, or extrudate form, which are at least 90.0% by weight zeolitic, is briefly as follows: Crystalline aluminosilicate solids are initially prepared, filtered and water-washed to reduce the content of amorphous material, and then re-slurried in water. The slurry is spray dried to substantially spherical particles having a nominal diameter of from 15 to 150 microns, and which are suitable for formation into pills. More specifically, the method is directed to the production of solid molecular sieves in an attrition-resistant aggregate form of desired size and shape, as opposed to other methods which result in pulverulent masses. Further, this method involves producing a faujasite-containing carrier material, at least 90.0% by weight of which is zeolitic, without excessive use of a foreign binder.

Molecular sieves, or crystalline aluminosilicates, have recently become increasingly important in the field of catalysts, and for use as adsorbents. Molecular sieves are of a crystalline structure having many small cavities connected by still smaller pores of uniform size. These pores may vary in size from about 3 angstrom units up to 12, or 15 angstrom units, or even more. However, a particular molecular sieve material desirably will have a uniform pore size. These crystalline aluminosilicate materials are chemically similar to clays and feldspars and belong in the class of materials called zeolites. Zeolites vary slightly in composition, although they generally contain aluminum, silicon, oxygen and an alkali and/or alkaline-earth metal. Zeolites may be dehydrated without the destruction of the crystal, leaving an interlaced structure of regularly spaced channels.

There are a number of ways in which crystalline aluminosilicates may be formed. One common way is to mix solutions of sodium silicate, or colloidal silica, and sodium aluminate (with or without excess sodium hydroxide) and allow the solutions to react and form a solid crystalline aluminosilicate. Another method is to contact a solid inorganic oxide selected from the group consisting of silicate, alumina and mixtures thereof with an aqueous treating solution containing alkali metal cations (preferably sodium) and anions selected from the group consisting of hydroxol, silicate and aluminate, and permit the solid-liquid mixture to react until the desired crystalline aluminosilicate has been formed. A third method is to contact certain clays or other materials containing silica and alumina with a basic, or alkaline material, preferably sodium hydroxide, under conditions to effect the crystallization of the aluminosilicate. Typically, such methods produce a synthetic zeolite in finely-divided powdered form, the size of which ranges from 0.5 micron to 5.0 microns. In order to obtain the zeolites in a useful size, the powdered zeolite is agglomerated with a binder, such as clay. These particles are typically produced in pellet or bead form by methods including extrusion. In order that such particles be of sufficient hardness, binders in amounts of 20.0% or more, by weight, of the total particle are employed. This results in a heterogenous mixture of crystalline zeolite and binder, in which the binder contributes nothing by way of catalytic action, but rather occupies valuable space within the particle. The presence of a binder results in poor zeolite particles since the binder has the tendency to plug some of the pores and otherwise interfere with the function of the crystalline aluminosilicate.

The preferred method of preparing the carrier material produces crystalline aluminosilicates of the faujasite modification, and utilizes aqueous solutions of colloidal silica and sodium aluminate. Colloidal silica is a suspension in which the suspended particles are present in very finely-divided form—i.e. a particle size from about one to about 500 millimicrons in diameter. Suitable silicas are readily available commercially, including those known by such trade names as "Santocel," "Cab-O-Sil" and "Hi-Sil."

There are many types of crystalline aluminosilicates which may be produced in a desired size and shape by this preferred method. Examplary of such crystalline aluminosilicates are phillipsite. Type A, faujasite, mordenite, Type U, etc. The type of crystalline aluminosilicate which is produced, depends on the conditions under which crystallization occurs, with the $SiO_2/Al_2O_3$ ratio, the $Na_2O/SiO_2$ ratio, the $H_2O/Na_2O$ ratio, temperature and time being the important variables.

After the solid crystalline aluminosilicate has formed, the mother liquor (spent solution) is separated from the solids by conventional methods such as decantation, or filtration. The solids are water-washed and filtered to remove undesirable ions, reducing the quantity of amorphous material, and are then re-slurried in water to a solids concentration of from about 5.0% to about 50.0% by weight. The re-slurrying is accomplished by adding a sufficient amount of water to the vessel in which the solids were formed, and violently agitating the contents of the vessel. Generally, when forming the crystalline solids, the mother liquor contains an appreciable amount of reactants. When forming faujasite, there is a substantial amount of sodium silicate remaining in the solution. If the solids are not water washed prior to forming, the sodium silicate is converted to $SiO_2$ functions as a glue, and many pieces of crystalline solid become bound together in an irregular manner. Therefore, it is necessary to water wash the solids prior to the re-slurrying technique in order to remove most of the sodium silicate. Generally, the solids should be washed with at least from one to five volumes of water, per volume of solids, in order to remove sufficient sodium silicate.

Water washing is accomplished by adding water to the vessel and pouring the contents onto a suitable filter. The filter cake, containing the solid crystalline aluminosilicate material, is water washed to the desired level and re-slurrid with water to a solids content from about 10.0% to about 20.0% by weight. The filter cake and the water are violently agitated and homogenized, until the agglomerates are broken and the solids are uniformly dispersed in what appears to be a colloidal suspension. The suspension is then spray dried by conventional means such as pressurizing the suspension through an orifice into a hot, dry chamber to form spray dried particles having a moisture content in the range of about 12.0% to about 14.0% by weight, and having a particle size distribution similar to fluid catalytic cracking catalyst. Preferably, the particle size distribution indicates an average particle diameter of from about 50 to about 75 microns, and within the size range of from about 15 to about 150 microns in diameter.

The solid particles are withdrawn from the drying chamber and are suitable for forming into finished particles of the desired size and shape. A preferable form of the finished particle results by pilling the spray-dried particles. The spray dried particles exhibit excellent flow and pilling properties, and are directly introduced into the pilling machines without the necessity for the addition of extraneous lubricant or binder. The pilling machines are set to produce particles having a crushing strength of from 2 to about 20 pounds, and preferably from about 5 to about 12 pounds.

An alternate method comprises compounding the spray dried particles with a minor amount of a temporary binder such as polyvinyl alcohol or Sterotex in quantities from about 1.0% to about 10.0% by weight, and preferably less than 5.0%. This temporary binder is useful in a commercial pilling operation where the spray drying conditions are not carefully controlled. The spray dried particles, containing the small amount of temporary binder, are formed into particles of desired size and shape by methods such as pilling or extrusion. Thereafter, the formed particles are contacted with an oxygen-containing gas, such as air, at elevated temperatures sufficient to burn out the temporary binder, leaving a substantially pure crystalline aluminosilicate. The temperatures required to burn the binder are above about 750° F., and below the temperature level which will injure the crystalline aluminosilicate structure, preferably below about 1000° F.

A preferred embodiment of the present invention resides in a pilled binderless faujasite catalyst. Faujasite is a crystalline aluminosilicate having pore openings in the vicinity of about 10 angstrom units. Faujasite is composed of silicon-centered and aluminum centered tetrahedra ($SiO_4$ and $AlO_4$) arranged in an orderly manner and crosslinked by the sharing of oxygen atoms so that the mol ratio of $O/(Al+Si)$ is 2. Faujasite has a very open structure, and is accordingly a preferable catalyst carrier material. I do not intend to exclude the catalytic properties that faujasite has, and the term "carrier material" is not intended to be synonomous with catalytic inertness. Faujasite is readily prepared by the method in which it is reslurried, spray dried and pilled. The pilled faujasite is activated catalytically by converting the sodium form either to the divalent form, the hydrogen form or mixtures thereof. The divalent form is prepared by ion-exhanging the sodium ions present in the faujasite with divalent cations such as calcium, magnesium or beryllium, until a substantial portion of the sodium is removed. The hydrogen form is prepared by ion-exchanging the sodium ions with ammonium ions, followed by thermal treatment of the ion-exchange particles at temperatures of from about 100° C. to about 350° C. to decompose the ammonium ions. Likewise, a mixed form may be prepared by combining these steps, preferably the divalent ion-exchange preceding the ammonium ion-exchange. The ion-exchange is carried out by contacting the solid pilled faujasite with an aqueous solution containing the desired cations.

The use of this binderless faujasite affords the operation of a successful hydrocracking process in which the reactants can readily reach the active sites of the catalyst, and in which there is no dilution or undesirable side reaction as a result of the presence of an extraneous binder. It is understood that it is intended that the hydrocracking process of using the binderless faujasite catalyst, combined with the metals hereinbefore set forth, is an integral part of my invention.

Some applications of my invention require a substantially sodium-free form of crystalline aluminosilicate. When faujasite, for example, is prepared by the method above-described, the sodium-free form is difficult to obtain; although the ion-exchange technique reduces the sodium to an acceptably low level, there remains a minor quantity which appears to be unaffected. This can be corrected by the relatively simple expediency of including ammonium ions in the aforementioned water washing procedures, effecting a replactment of some of the sodium ions. Upon calcination, this partial ion-exchange causes the sodium to become labile, and substantially all of it can be exchanged to either the hydrogen, or divalent form. This increases the activtiy of the final catalyst where necessary, and is, therefore, an advantageous scheme to integrate into the method of preparation.

DESCRIPTION OF CATALYTIC COMPOSITES

The novel hydrocracking catalysts of the present invention comprise Group VII–B metals, having an atomic number greater than 25 and Group I–B metals having an atomic number below 79. Thus, in accordance with the Periodic Table of The Elements, E. H. Sargent & Company, 1964, catalytically active metallic components are selected from the group consisting of rhenium, technetium, copper and silver. An essential ingredient of the catalyst of the present invention is a Group VII–B metal component, having an atomic number greater than 25. This component, either rhenium and/or technetium, may be present as an elemental metal, a chemical compound such as the oxide, sulfide, halide, or in some physical or chemical association with the crystalline alumino-silicate carried material and/or other components of the catalyst. Generally, the rhenium or technetium component is utilized in an amonut sufficient to result in a final catalytic composite containing about 0.1% to about 2.0% by weight, calculated as if existing in the elemental state. The rhenium or technetium component may be incorporated within the carrier material in any suitable manner, and at any stage in the preparation of the catalyst. As a general rule, it is advisable to introduce the Group VII–B metal at a later step of the preparation in order that this expensive metal will not be lost due to subsequent processing involving washing and purification treatments. The preferred procedure for incorporating this component involves impregnation of the carrier material, either before, during or after other components are added. Ion-exchange with the ammonium or divalent form of the carrier is also an acceptable means for combining the Group VII–B metal component. The impregnation solution can, in some cases, be an aqueous solution of a suitable salt such as, for example, ammonium perrhenate. In addition, an aqueous solution of the halides, such as the chloride, may be used where desired; however, the preferred impregnation solution constitutes an aqueous solution of perrhenic acid. In general, the component can be impregnated either prior to, simultaneous with, or after the Group I–B metal component. However, best results are achieved when the component is impregnated simultaneously with the Group I–B metallic component.

As indicated above, the catalyst of the present invention also contains a Group I–B metal component, having an atomic number below 79. Thus, the Group VII–B metal component is combined with a copper and/or a silver metal component, the use of gold not being practical from the standpoint of expense and the results obtained. The Group I–B metallic component, such as copper, may exist within the final catalytic composite as a compound, including an oxide, sulfide, halide, etc., or in the elemental state. Generally, the amount of the Group I–B metallic component, present in the final catalyst, is about 0.5% to about 5.0% by weight, calculated as the element. Suitable results are obtained when the catalyst contains about 0.75 to about 3.5% by weight of the Group I–B metal component.

The Group I–B metallic component may be incorporated into the catalytic composite in any suitable manner such as ion-exchange with the carrier material, or impregnation of the carrier material at any stage in its preparation, and either before or after calcination. A preferred method of preparing the catalyst involves the ultilization of a water-soluble compound to impregnate the crystalline aluminosilicate. Thus, the Group I–B metal may be added to the carrier material by commingling the latter with an aqueous solution of silver nitrate, cupric acetate, cupric chloride, cupric nitrate, etc. Following the impregnation, the resulting impregnated carrier material is dried and subjected to a high-temperature calcination, or oxidation technique, similar to the one hereinabove set forth in conjunction with the description of the preparation of the crystalline aluminosilicate particles. Regardless of the precise manner in which the components of the catalyst are composited with the carrier material, the final catalyst will generally be dried at a temperature of from about 200° F. to about 600° F., for a period of from about 2 to about 24 hours, and ultimately calcined at an elevated temperatur of about 750° F. to about 1000° F., for a period of about 0.5 to 10 hours, and preferably from about 1 to about 5 hours.

It is preferred that the resultant calcined catalytic composite be subjected to a substantially water-free reduction prior to its use in the conversion of hydrocarbons. This step is designed to insure a uniform and finely-divided dispersion of the metallic components throughout the carrier material preferably, substantially pure and dry hydrogen (i.e. less than about 30.0 p.p.m. of water by weight) is used as the reducing agent in this technique. The reducing agent is contacted with the calcined catalyst at a temperature of about 800° F. to about 1200° F., and for a period of time of about 0.5 to 10 hours, or more, to substantially reduce both metallic components to their elemental state. This reduction treatment may be performed in situ as part of a start-up sequence, provided precautions are taken to pre-dry the unit to a substantially water-free state.

Although not essential to my invention, the resulting reduced catalytic composite may, in some cases, be beneficially subjected to a presulfiding operation designed to incorporate from about 0.05 to about 0.50% by weight of sulfur, calculated on an elemental basis. This presulfiding treatment takes place in the presence of hydrogen and a suitable sulfur-containing compound such as hydrogen sulfide, lower molecular weight mercaptans, organic sulfides, etc. Typically, this procedure comprises contacting the reduced catalyst with a sulfiding gas such as a mixture of hydrogen and hydrogen sulfide having about 10 mols of hydrogen per mol of hydrogen sulfide, at conditions to effect the incorporation of sulfur, and generally including a temperature ranging from about 50° F. up to about 1100° F.

Another possible constituent of the catalyst of the present invention, particularly when hydrocracking extremely heavy charge stocks, is a halogen component. Although the precise form of the chemistry of the association of the halogen component with the carrier material is not accurately known, it is customary in the art to refer to the halogen component as being combined with the carrier, or with the other ingredients of the catalyst. This combined halogen may be either fluorine, chlorine, iodine, bromine or mixtures thereof, fluorine and particularly chlorine being preferred. In any event, the halogen will be composited with the carrier material in such a manner as to result in a final catalyst containing about 0.1% to about 1.5%, and preferably from about 0.4% to about 0.9% by weight of halogen, calculated on an elemental basis.

EXAMPLES

The following examples are presented to further illustrate the present invention, and the use thereof in hydrocracking hydrocarbonaceous material. It is not intended to limit the invention to the materials used, nor the conditions employed therein, beyond the scope and spirit of the appended claims.

EXAMPLE I

Solid sodium aluminate, in an amount of about 78.0 grams, and containing about 46.0% by weight of alumina and 31.0% by weight of sodium oxide is dissolved in about 952 cc. of water to form a sodium aluminate solution. To this solution is added about 194.4 grams of sodium hydroxide pellets (98.0% by weight sodium hydroxide). This mixture is cooled to a temperature of 75° F., and a silica solution containing 35.0% by weight of $SiO_2$, and in an amount of 1180 grams, is slowly added thereto over a period of about 15 minutes. The resulting solution is stirred gently for about 1 hour at ambient temperature, followed by a quiescent age for a period of 20 hours with occasional gentle stirring. This mixture is heated to a temperature of about 95° C., through the use of a heat-exchanger, and is introduced into a glass-lined vessel. For a period of about 48 hours, the mixture is aged quiescently at about 95° C. The mother liquor is separated from the formed crystals by decantation. Water is added to the vessel and the crystals and water are water-washed until most of the silicate ions have been removed. The water-washed crystals are re-slurried in water to a solids concentration of about 20.0% by weight. The re-slurried mixture is pressured through an orifice into a hot chamber at conditions to produce spray-dried particles of about 65 microns in average diameter. The spray-dried particles are introduced into a pilling machine where they are pilled into ⅛-inch by ⅛-inch cylinders having about a 10-pound crushing strength. The resulting pills are analyzed, and shown to be substantially pure faujasite; that is, about 93.5% by weight zeolitic material.

The pills are subjected to ion-exchange with solutions of ammonium chloride in repeated batch washing steps until there is no further removal of sodium ions from the pills. The ion-exchanged pills are heated in an oven to a temperature of about 150° C. The resulting pills are contacted with a solution of perrhenic acid and cupric nitrate, in a rotating evaporator until the solution has evaporated. The amount of perrhenic acid and cupric nitrate is such that the catalyst is impregnated with about 1.0% by weight of rhenium and 1.0% by weight of copper, calculated as the elemental metals. The impregnated pills are thereupon oxidized to produce the finished catalyst.

A batch of the finished catalyst is loaded into a reaction zone, being reduced therein with hydrogen. A charge stock, consisting of a light gas oil in which the organic sulfur and nitrogen compounds have been converted to hydrogen sulfide, ammonia and hydrocarbons, by way of conversion in a prior hydrorefining step, is introduced into the reactor while maintaining a liquid hourly space velocity of about 1.5, a reactor pressure of about 1500 p.s.i.g. and a circulating hydrogen rate of about 10,000 standard cubic feet per barrel. The charge stock is converted into gasoline boiling range hydrocarbons having a low degree of olefinicity, and the catalyst appears to be stable.

EXAMPLE II

This example is presented to illustrate a commercial application of my invention in hydrocracking a light naphtha for maximum LPG (Liquefied Petroleum Gas) production accompanied by minimum loss to methane and ethane. The commercial unit is designed for a fresh feed capacity of about 10,000 bbl./day; in this illustration, the fresh feed rate is 7,000 bbl./day, and a recycled diluent of hexane-plus in an amount of 2,800 bbl./day provides a combined liquid feed ratio of 1.4.

The charge stock is a depentanized naphtha having an initial boiling point of about 154° F. and an end boiling point of about 257° F. The gravity is about 69.0° API, and the component make-up indicates 79.4% by volume paraffins, 16.9% naphthenes and about 3.7% by volume aromatics. The reaction zone is maintained under an imposed hydrogen pressure of 1500 p.s.i.g., the hydrogen circulation rate being 6,000 s.c.f./bbl., based upon fresh feed only. The temperature at the inlet to the catalyst bed is controlled to maintain an outlet temperature of about 800° F., and the liquid hourly space velocity, considering only the fresh feed, is 1.0

The catalytic composite is in an amount of about 1,640 cubic feet, and is a crystalline aluminosilicate, 92.6% by weight of which is zeolitic, and prepared in the manner hereinbefore set forth. The carrier material is impregnated with an aqueous solution of perrhenic acid, cupric chloride and hydrochloric acid, in an amount to yield a final catalyst containing 2.0% by weight of copper, 0.85% by weight of rhenium and 0.5% by weight of combined chloride, all of which are computed on an elemental basis. Prior to commencing the flow of charge stock, the catalyst is reduced in situ with hydrogen containing about 20.0 p.p.m. by volume of water.

The product effluent from the reaction zone is introduced into a high-pressure separator at a temperature of about 110° F. A hydrogen-rich vaporous phase is withdrawn and, after the addition thereto of about 1400 s.c.f./bbl. of make-up hydrogen, is recycled via compressive means to the reaction zone. The normally liquid product effluent is passed into a suitable fractionation system for separation of about 2,800 bbl./day of a hexane-plus hydrocarbon stream which is recycled to combine with the depentanized fresh feed, and to provide a $C_3/C_4$ LPG concentrate and a pentane concentrate.

The component overall yields are presented in the following table, and include 1,388 s.c.f./bbl. (2.98% by weight) of hydrogen consumed in the process.

TABLE.—COMPONENT YIELDS

| Component | Weight percent | Volume percent |
|---|---|---|
| Ammonia | 0.21 | |
| Hydrogen sulfide | 0.78 | |
| Methane | 3.30 | |
| Ethane | | |
| Propane | 44.90 | 62.41 |
| Butane | 44.50 | 55.04 |
| Total $C_3/C_4$ | 89.40 | 117.45 |
| Pentane concentrate | 9.29 | 10.47 |

It is significant that the wt.% yield of desired product was almost 90.0%, accomplished with only 4.08% by weight loss to methane and ethane. Of further interest is the fact that the pentane concentrate is virtually 100.0% paraffinic, of which about 80.0% are iso-paraffins.

The foregoing specification and example illustrate the benefits afforded the hydrocracking of hydrocarbons through the utilization of my invention.

I claim as my invention:

1. A catalytic composite comprising a substantially pure crystalline aluminosilicate carrier material, of which at least about 90.0% by weight is zeolitic, from about 0.1 to about 2.0 wt. percent of a rhenium component, and from about 0.5 to about 5.0 wt. percent of a Group I–B metal component having an atomic number below 79.

2. A catalytic composite of a faujasite-containing carrier material, of which at least about 90.0% by weight is zeolitic, from 0.1% to about 2.0% by weight of a rhenium component and from about 0.5% to about 5.0% by weight of a Group I–B metal component having an atomic number below 79, calculated as the elemental metals.

3. The catalytic composite of claim 2 further characterized in that said Group I–B metal component is a silver component.

4. The catalytic composite of claim 3 further characterized in that said Group I–B metal component is a copper component.

5. A process for hydrocracking a hydrocarbonaceous charge stock into lower molecular weight hydrocarbons, which process comprises reacting said charge stock with hydrogen at hydrocracking conditions, and in contact with a catalytic composite of a carrier material of substantially pure crystalline aluminosilicate particles, at least about 90.0% by weight of which is zeolitic, from about 0.1 to about 2.0 wt. percent of a rhenium component and from about 0.5 to about 5.0 wt. percent of a Group I–B metal component having an atomic number below 79, and, separating the resulting hydrocracked product effluent to recover hydrocarbons of lower molecular weight, said hydrocracking conditions including a liquid hourly space velocity from about 0.25 to about 10.0, a pressure of about 800 to about 3,000 p.s.i.g., a catalyst bed temperature of 400° F. to about 900° F. and hydrogen in an amount of 3,000 to about 50,000 s.c.f./bbl.

6. The process of claim 5 further characterized in that said Group I–B metal component is a silver component.

7. The process of claim 5 further characterized in that said Group I–B metal component is a copper component.

References Cited

UNITED STATES PATENTS

| 3,236,762 | 2/1966 | Rabo et al. | 208—111 |
| 3,239,448 | 3/1966 | Wilson | 208—111 |
| 3,434,960 | 3/1969 | Jacobson et al. | 208—138 |

DELBERT E. GANTZ, Primary Examiner

R. BRUSKIN, Assistant Examiner

U.S. Cl. X.R.

252—455